(12) United States Patent
Wee et al.

(10) Patent No.: US 8,960,016 B2
(45) Date of Patent: Feb. 24, 2015

(54) METHOD AND APPARATUS FOR MEASUREMENT OF COMPOSITION AND FLOW RATES OF A WET GAS

(75) Inventors: Arnstein Wee, Oslo (NO); Ingve Morten Skjaeldal, Hafrsfjord (NO)

(73) Assignee: Multi Phase Meters AS, Forus (NO)

( * ) Notice: Subject to any disclaimer, the term of this patent is extended or adjusted under 35 U.S.C. 154(b) by 672 days.

(21) Appl. No.: 13/139,439

(22) PCT Filed: Dec. 14, 2009

(86) PCT No.: PCT/NO2009/000431
§ 371 (c)(1),
(2), (4) Date: Aug. 23, 2011

(87) PCT Pub. No.: WO2010/068117
PCT Pub. Date: Jun. 17, 2010

(65) Prior Publication Data

US 2011/0290035 A1 Dec. 1, 2011

(30) Foreign Application Priority Data

Dec. 12, 2008 (NO) .................................. 20085197

(51) Int. Cl.
*G01F 1/74* (2006.01)
*G01F 1/88* (2006.01)
*G01F 1/36* (2006.01)

(52) U.S. Cl.
CPC *G01F 1/74* (2013.01); *G01F 1/363* (2013.01); *G01F 1/88* (2013.01)
USPC ..... 73/861.04; 702/30; 73/861.61; 73/861.63

(58) Field of Classification Search
None
See application file for complete search history.

(56) References Cited

U.S. PATENT DOCUMENTS

| 4,201,083 A | 5/1980 | Kurita et al. |
|---|---|---|
| 4,402,230 A | 9/1983 | Raptis |

(Continued)

FOREIGN PATENT DOCUMENTS

| EP | 0 225 741 A | 6/1987 |
|---|---|---|
| EP | 1 793 109 A | 6/2007 |

(Continued)

OTHER PUBLICATIONS

Blaney, Stephen et al.: "Investigation of the exploitation of a fast-sampling single gamma densitometer and pattern recognition to resolve the superfidal phase velocities and liquid phase water cut of vertically upward multiphase flows", *Flow Measurement and Instrumentation*, vol. 19, Issue 2, Apr. 2008, Abstract Only.

(Continued)

*Primary Examiner* — Harshad R Patel
(74) *Attorney, Agent, or Firm* — Frommer Lawrence & Haug LLP; Ronald R. Santucci

(57) ABSTRACT

A method for determining the flow rates of a fluid comprising a multi-component mixture of a gas and at least one liquid in a pipe, the method comprising the following steps: a. the permittivity of the multi-component mixture is determined based on an electromagnetic measurement, b. a statistical parameter related to the electromagnetic measurement is calculated, c. the density of the multi-component is determined, d. the temperature and pressure are obtained, e. based on the knowledge of densities and dielectric constants of the components of the fluid mixture, and the result from the above steps a-c, the water fraction of the multi-component mixture is calculated, characterized by a method for determining the liquid fraction and flow rates of the multi-component mixture where f. the liquid fraction is calculated based on the statistical parameter from step b and the calculated water fraction from step e using an empirical derived curve, g. the velocity of the multi-component mixture is derived, and h. based on the step a-g, the flow rate of the individual components of the multi-component mixture is calculated. An apparatus for performing the method is also disclosed.

28 Claims, 5 Drawing Sheets

(56) References Cited

U.S. PATENT DOCUMENTS

Figure 1:
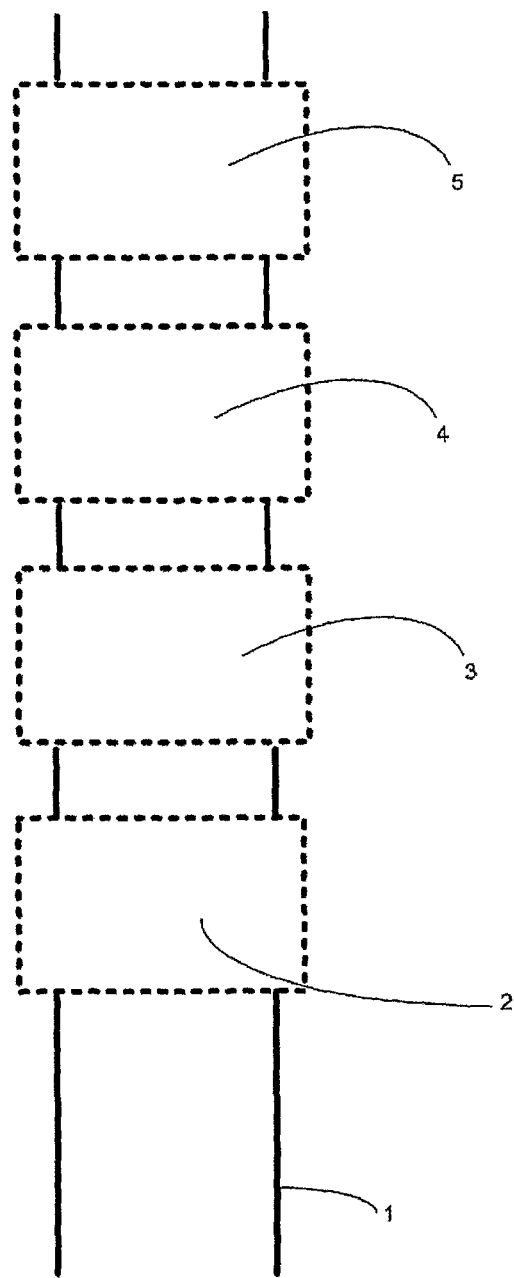

| | | | |
|---|---|---|---|
| 4,423,623 | A | 1/1984 | Ho et al. |
| 4,459,858 | A | 7/1984 | Marsh |
| 4,638,672 | A | 1/1987 | McCall |
| 4,974,452 | A | 12/1990 | Hunt et al. |
| 4,976,154 | A | 12/1990 | Schneider et al. |
| 5,103,181 | A | 4/1992 | Gaisford et al. |
| 5,135,684 | A | 8/1992 | Mohn et al. |
| 5,331,284 | A | 7/1994 | Jean et al. |
| 5,351,521 | A | 10/1994 | Cracknell |
| 5,455,516 | A | 10/1995 | Jean et al. |
| 5,576,974 | A | 11/1996 | Marrelli et al. |
| 5,597,961 | A | 1/1997 | Marrelli |
| 5,701,083 | A | 12/1997 | Goldberg et al. |
| 6,009,760 | A | 1/2000 | Jakkula et al. |
| 6,097,786 | A | 8/2000 | Groves et al. |
| 6,109,097 | A | 8/2000 | Conrads et al. |
| 6,332,111 | B1 | 12/2001 | Fincke |
| 6,335,959 | B1 | 1/2002 | Lynch et al. |
| 6,378,380 | B1 | 4/2002 | Kusters et al. |
| 6,405,604 | B1 | 6/2002 | Berard et al. |
| 6,614,238 | B1 | 9/2003 | Jean et al. |
| 6,755,086 | B2 | 6/2004 | Salamitou et al. |
| 6,898,986 | B2 | 5/2005 | Daniel et al. |
| 6,993,979 | B2 | 2/2006 | Segeral |
| 7,624,652 | B2 * | 12/2009 | Wee et al. .................. 73/861.63 |
| 8,224,588 | B2 * | 7/2012 | Wee ................................ 702/30 |

FOREIGN PATENT DOCUMENTS

| | | |
|---|---|---|
| GB | 2221042 A | 1/1990 |
| NO | 324812 B1 | 12/2007 |
| WO | WO 94/17373 A | 8/1994 |
| WO | WO 00/45133 A | 8/2000 |
| WO | WO 02/44664 A | 6/2002 |
| WO | WO 03/034051 A | 4/2003 |
| WO | WO 2005/057142 A | 6/2005 |
| WO | WO 2007/084652 A | 7/2007 |
| WO | WO 2007/129897 A | 11/2007 |

OTHER PUBLICATIONS

Norwegian search report dated Jul. 8, 2009 for related Norwegian application 2008 5197.

Sidsel Corneliussen et al., Handbook of Multiphase Flow Metering; Norwegian Society for Oil and Gas Measurement; Revision Mar. 2, 2005; pp. 1-113;Tekna.

Kjetil Folgero and Tore Tjomsland Permittivity measurement of thin liquid layers using open-ended coaxial probes; Measurement Science and Technology; 1996; vol. 7 and 8; 1164 doi.

L.F. Chen. C.K. Ong et al.; Transmission/Reflection Methods; Microwave Electronics: Measurement and Materials Characterization; 2004; pp. 175-207; John Wiley & Sons, Ltd.; England.

* cited by examiner

METHOD AND APPARATUS FOR MEASUREMENT OF COMPOSITION AND FLOW RATES OF A WET GAS

This application is a 371 of PCT/NO2009/000431 filed on Dec. 14, 2009, published on Jun. 17, 2010 under publication number WO 2010/068117 A which claims priority benefits from Norwegian Patent Application No. 2008 5197 filed Dec. 12, 2008, the disclosure of which is incorporated herein by reference.

The present invention relates to a method and apparatus for measurement of the individual components of multiphase fluid comprising a multicomponent mixture of a gas and at least one liquid in a pipe.

The problem of how to meter oil-water-gas mixtures has been of interest to the petroleum industry since the early 1980s. Since then considerable research has been conducted into the development of a three-phase flow meter suitable for use in an industrial environment.

Multiphase flow in the oil & gas industry is commonly defined as a mixture of liquids and gas where the amount of free gas, also denoted GVF, is less than 90-95% of the volume of the pipe. For GVFs in the range 95%-99.99%, the multiphase flow is often referred to as a wet gas where the liquid part is water and condensate (light oil). However, a typical wetgas wells have a GVF above 97% and it is most common with GVFs in the range 99.5-99.9%.

There are several techniques and known instruments for measuring multiphase and wet gases, as will be further described below. Such instruments need to be reasonably accurate (typically better than ±5% of rate for each phase), non-intrusive, reliable, flow regime independent and provide accurate measurements over the full component fraction range. In spite of the large number of solutions that have been proposed in recent years, no commercially available three phase wet gas flow meter yet meets all these requirements. In addition to stringent measurement requirements, the instrument needs to perform reliable in a harsh and corrosive environment such as several thousand meters below the sea surface. Inside the pipe, the flowing multiphase fluid may be traveling at a speed of 1-50 m/s with pressures in excess of 1000 bars and temperatures above 200° C. Sand is often also present and can damage the interior of the instrument.

Wet gas flow meters are increasingly used for well testing and allocation measurement. In order to optimize the production and life of an oil/gas field, operators need to be able to regularly monitor the output of each well in the field. The conventional way of doing this is to use a test separator. Test separators are expensive, occupy valuable space on a production platform, and require a long time to monitor each well because of the stabilized flow conditions required. In addition, test separators are only moderately accurate (typically ±5 to 10% of each phase flow rate) and cannot be used for continuous well monitoring. A wet gas flow meter could be used in the first instance instead of a test separator and in the long term as a permanent installation on each well. Such an arrangement would save the loss in production normally associated with well testing. Such loss is estimated to be approximately 2% for a typical offshore installation. Allocation metering is needed when a common pipeline is used to transport the output from a number of wells owned by different companies to a processing facility. This is currently achieved by passing the output of each well through a test separator before entering the common pipeline. However, in addition to the disadvantages of the test separator described above, dedicated test pipelines to each well are also required. A permanently installed wet gas flow meter would offer significant advantages for allocation metering.

The formation water in the hydrocarbon reservoir is typical saline water. Under normal situations, the well should not produce any formation water. In fact, formation water in the pipeline can cause hydrate and scale formation in addition to severe pipeline corrosion. If the amount of formation and fresh water (also referred as total water fraction) in a well is known to the field operator, chemical inhibitors can be injected into the well stream in order to limit the unwanted effects due to the water. Alternatively, the production rate from the well can be changed in order to minimize or reduce the formation water production or shut down the well completely to spare the pipeline infrastructure. It is of particular interest to measure the formation and fresh water content of remotely operated subsea wells since the cost of the pipelines in such an installation is severe. It is common for most subsea installations to commingle wells into a common pipeline and transporting the multiphase fluid to a process facility. Such a process facility may be located several hounded kilometers from the seabed installation leading to long multiphase transportation pipes on the seabed. Consequently, it may take many months to detect and identify a well producing saline water without a wet gas flow meter which is able to perform accurate measurement of the produced water.

A wet gas flow meter also needs to be robust with respect to uncertainty in configuration parameters. Typical configuration parameters for commercially available wet gas meters are density, permittivity (dielectric constant), mass absorption coefficients and viscosity data for all the fluids contained in the wet gas. For wetgas flow meters where the split between liquid and gas is based on a density measurement of the wet gas and a known density values for the gas and liquid phase, the measured liquid fractions (water and oil) are highly influenced by the density value for the gas. In effect, the density value for the gas determines the zero point for the liquid fraction measurement. In most real life applications the uncertainty in the gas density may be in the order of 2-7% and change significantly over time due to compositional changes in the reservoir. This may cause significant measurement errors for the liquid parts which easily may be in the order of several hounded percent. For a typical wetgas application with an operating pressure of 150 bar, the measured mixture (wet gas) density may be 112.7 kg/m3. Assuming a gas density of 110 kg/m3 and condensate (oil) density of 650 kg/m3, the calculated GVF becomes 99.5%. I.e., 0.5% of the volume in the pipe is liquid. If on the other hand, the gas density was wrong by 5% such that the true gas density was 104.5 kg/m3 instead of 110 kg/m3, the calculated GVF then becomes 98.5% which correspond to a liquid fraction of 1.5%. For the example above, a change in the gas density of 5% causes a measurement error on the liquid fraction (and liquid flow rate) of 200%. If the measured mixture density was slightly lower (i.e. 111.35 kg/m3) the calculated GVF based on a gas density of 110 kg/m3 then becomes 99.75% corresponding to a liquid fraction of 0.25%. Again, if the gas density was wrong by 5% such that the true gas density was 104.5 kg/m3 instead of 110 kg/m3, the calculated GVF then becomes 98.75% which correspond to a liquid fraction of 1.25% causing a 400% measurement error on the liquid fraction. Consequently, the measurement uncertainty for the liquid parts related to uncertainties in the gas density increases exponentially as the gas fraction in the pipe increases.

Any error in the measured liquid fraction relates directly to a corresponding measurement error on the calculated flow rates for a wet gas meter since the flow rates is derived by multiplying the measured fractions with the velocity of the fluids in the pipe.

Some examples of commercially available non-intrusive multiphase meters are shown in U.S. Pat. Nos. 5,103,181, 6,097,786, 5,135,684 and WO 2007/129897. A nuclear densitometer is used to measure the mixture density and the mixture density is use (directly or indirectly) to split the multiphase mixture into liquid and gas. Hence the meters are significantly influenced by any unknown changes or discrepancies in the gas density as outlined in the example above.

It is also well known that the composition of the multiphase mixture can be measured based on a measurement of the cut-off frequency of the pipe. Examples of such devices are found in U.S. Pat. Nos. 4,423,623, 5,455,516, 5,331,284, 6,614,238, 6,109,097 and 5,351,521, describing methods for determining the composition of a multiphase mixture based on a measurement of the cut-off frequency of a pipe based on loss or phase measurements at a varying frequency. However, all these methods are highly influenced by changes in the gas density at high gas fraction and will not provide accurate measurement of the liquid components of a wet gas.

Devices for measuring the flow rates of a multiphase fluid are well known. Such devices may be based on cross correlation of a measurement signal detecting variations in liquid and gas droplets of the flow. By transmitting a carrier signal into the flow and measuring the response, the received signal contain information of the variations in the flow caused by amplitude (loss), phase or frequency modulation by the disturbances. By performing the measurements at two sections of the pipe located at a known distance from each other, one can create two time varying signals that are shifted in time equal to the time it takes the multiphase flow to travel between the two sections. Example of such devices based on an electromagnetic carrier signal are disclosed in U.S. Pat. Nos. 4,402,230, 4,459,858, 4,201,083, 4,976,154, WO94/17373, U.S. Pat. Nos. 6,009,760 and 5,701,083

Other devises for measurement of flow rates may be based on measurement of differential pressures across a restriction in the pipe such as a venturi, orifice, v-cone or flow mixer. Examples of such devices can be found in U.S. Pat. Nos. 4,638,672, 4,974,452, 6,332,111, 6,335,959, 6,378,380, 6,755,086, 6,898,986, 6,993,979, 5,135,684, WO 00/45133 and WO03/034051. All these devices are subject to the same limitations as described in the example above where any error in the assumed gas density can cause significant errors on the measured liquid flow rate.

Flow meters which use statistical information from the flow to derive the composition of the multiphase flow are also known. One such example is found in U.S. Pat. No. 5,576, 974. Typical for such devices is that they rely too much on the statistical information to provide reliable result in any practical applications. As in U.S. Pat. No. 5,576,974 both the water fraction and the gas fraction is calculated based on microwave measurement. Statistical variation in a microwave signal passing through or reflected from a wet gas stream is related to both the droplet size, number of droplets and the amount of water in the liquid droplets. Both an increase in the amount of liquid droplets and increase in the amount of water in the liquid droplets cause an increase in the statistical variation of the microwave signal. Hence, a device such as described in U.S. Pat. No. 5,576,974 which purely relies on information from one type of sensors, will not be able to reliable discriminate between compositional changes due to change in the water/oil ratio compared to a change in the gas/liquid ratio. Any presence of liquid film in the pipe would further complicate the interpretation of the statistical information since the underlying time variance of the liquid film has a completely different frequency compared to the liquid droplets. Other such devices may be insensitive to the small variations caused by small liquid droplets in the gas phase since this in many cases can be dispersed as fine mist which makes it difficult to detect small variations with sensing techniques based on sound variations, pressure variations etc. GB 2.221.042 is an example of a measurement method which relies purely on statistical methods based on simple sensors which is unable to provide accurate measurement at wet gas flow conditions. The method described in GB 2.221.042 may also lead to unstable measurements since there is multiple solutions (i.e. multiple combination of the oil, water and gas fractions) which fits the measured parameters.

It is the purpose of this invention to overcome the above mentioned limitations of existing solutions.

It is the purpose of the invention to provide accurate measurements of the oil, water and gas flow rates of a wet gas.

It is the purpose of the invention to provide accurate measurement of the liquid fraction of a wet gas when the gas properties such as density and permittivity contain large uncertainty.

It is the purpose of the invention to provide accurate measurement of the liquid fraction of a wet gas when the gas properties such as density and permittivity are changing over time.

It is the purpose of this invention to provide accurate measurement of the liquid and gas fraction when the liquid is contained as droplet in the gas phase.

It is the purpose of this invention to provide accurate measurement of the liquid fraction when the liquid is contained as droplet in the gas phase in combination with liquid film along the wall of the pipe.

It is the purpose of this invention to provide a compact structure for flow conditioning and measurements.

It is the purpose of this invention to allow the use of simple calibration routines for a multiphase flow meter.

It is the purpose of this invention to allow the use of simple verification routines for a multiphase flow meter.

It is the purpose of this invention to provide a multiphase flow meter with high measurement accuracy at wet gas flow conditions.

It is the purpose of this invention to provide little pressure drop in the pipe of the flowing wet gas.

It is the purpose of this invention to provide a non-intrusive device for performing wet gas flow measurements.

It is the purpose of this invention to allow compact installation of a wet gas flow meter.

It is the purpose of the invention to provide a compact mechanical structure for performing the measurements.

Thus, the invention comprises a method or determiniing the flow rates of a fluid comprising a multi-component mixture of a as and at least one liquid in a pipe, the method comprising the following steps:

a. the permittivity at the multi-component mixture is determined based on an electromagnetic measurement,
b. the density of the multi-component is determined.
c. the temperature and pressure are obtained,
d. based on the knowledge of densities and dielectric constants of the components of the fluid mixture, and the result from the above steps a-c, the water fraction or the multi-component mixture is calculated.

The invention is characterized by a method for determining the liquid fraction and flow rates of the multi-component mixture where e. a statistical parameter related to the said electromagnetic measurement is calculated, f. the liquid fraction is calculated based on the statistical parameter from step d and the calculated water fraction from step e using an empirical derived curve, g. the velocity of the multi-component mixture is derived, and h. based on the step a-g, the flow rate of the individual components of the multi-component mixture is calculated.

Figure 2:
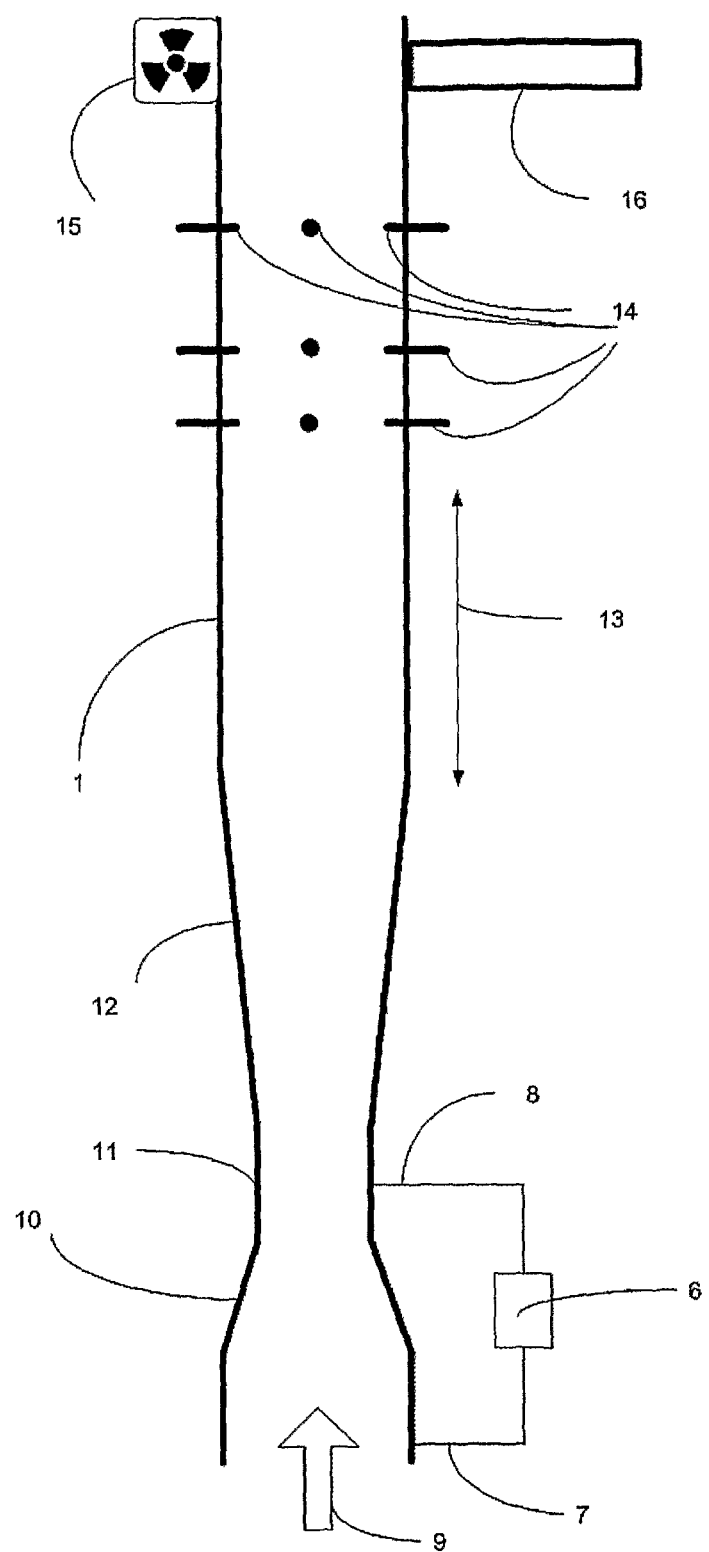
Figure 3:
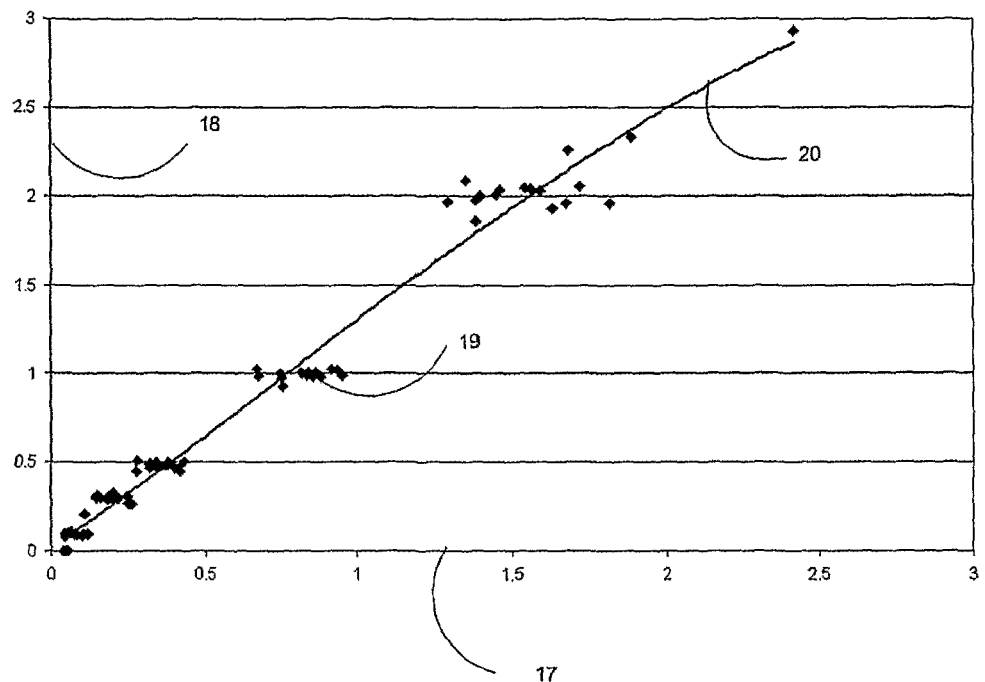
Figure 4:
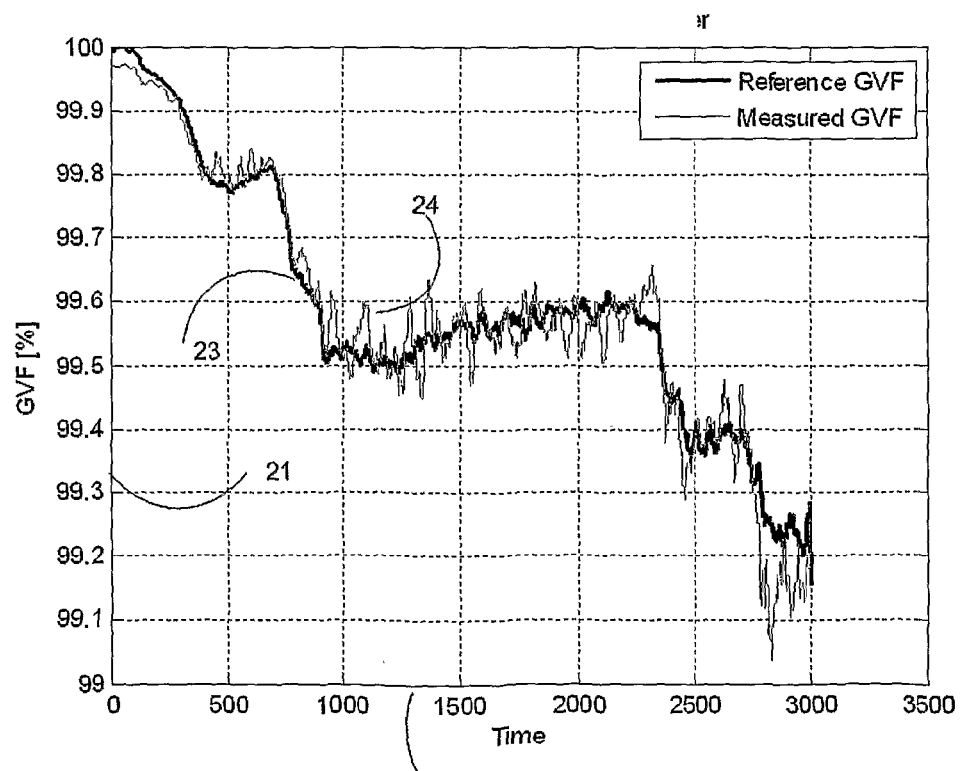
Figure 5:
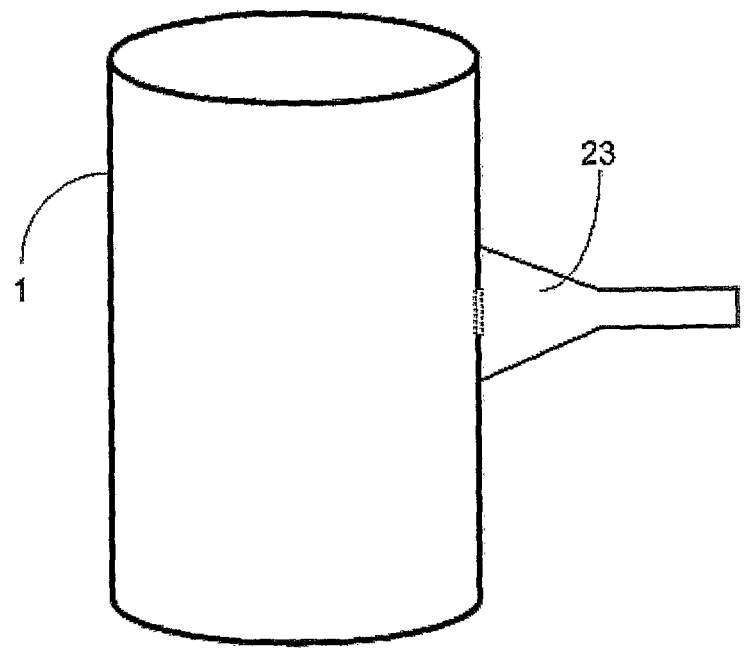
Figure 6:
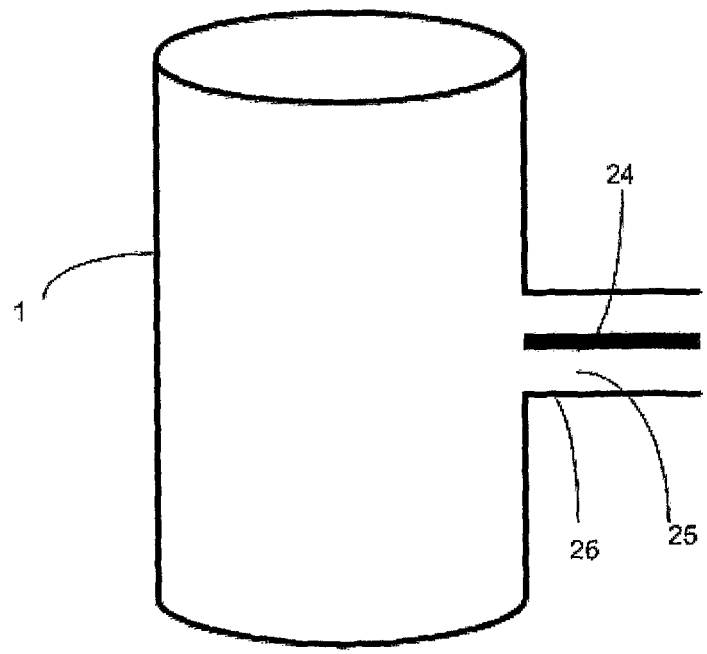
Figure 7:
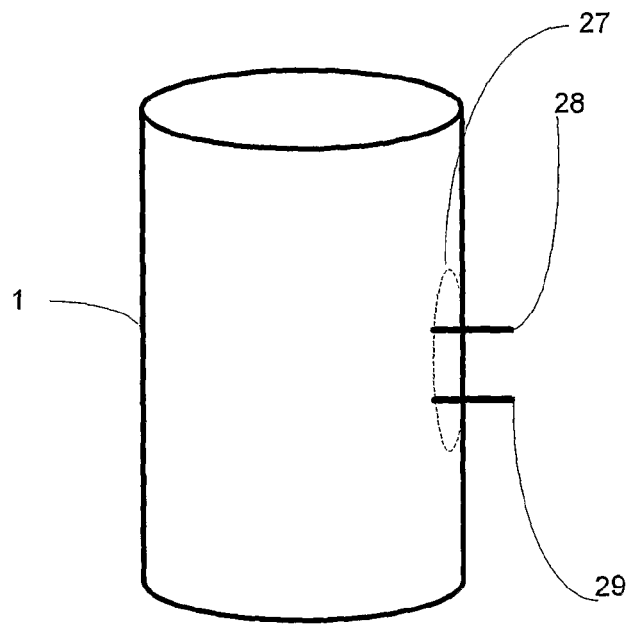
Figure 8:
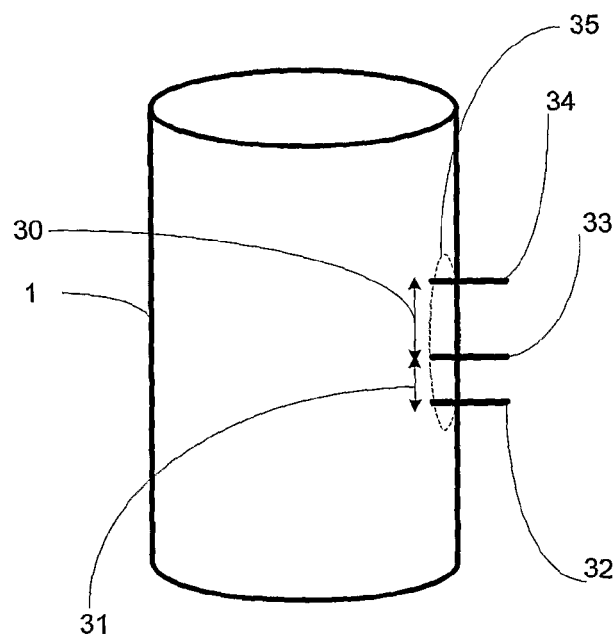

The invention will be further described in the following with reference to the figures, where:

FIG. 1 shows a schematic longitudinal sectional view of the main elements of the invention, FIG. 2 shows a schematic longitudinal sectional view of an exemplifying embodiment of an apparatus for measuring the oil, water and gas fractions and flow rates according to the invention, FIG. 3 shows a curve relating a statistical electrical parameter to the liquid fraction of a wet gas, FIG. 4 shows the measured liquid fraction of a wet gas vs. a reference value as a function of time FIG. 5 shows a schematic longitudinal sectional view of an exemplifying embodiment of an apparatus for performing electromagnetic measurements according to the invention, FIG. 6 shows a schematic longitudinal sectional view of an exemplifying embodiment of an apparatus for performing electromagnetic measurements according to the invention, FIG. 7 shows a schematic longitudinal sectional view of an exemplifying embodiment of an apparatus for performing electromagnetic measurements according to the invention, FIG. 8 shows a schematic longitudinal sectional view of an exemplifying embodiment of an apparatus for performing electromagnetic measurements according to the invention, The present invention relates to a method and apparatus for measuring, the flow rates and volume fraction of a wet gas mixture in a pipe. The invention contains five elements as shown in FIG. 1 A tubular section 1, a device for measuring the velocity of the wet gas mixture 2, a device for measuring the water fraction of the wet gas mixture 3. a device for measuring the density of the wet gas mixture 4 and a device for measuring the statistical variation of the wet gas mixture 5. The flow direction may he either upward or downward. The device may also be located either horizontal or any other inclination, however. vertical upward and downward blow are preferred orientations. The device also contains elements for measurement of temperature and pressure for compensation purposes: however these elements are omitted from the drawings and further description for simplicity. Some of these devices can be combined together as shown in FIG. 2 where the device for performing permittivity measurement also can he used to measure the statistical variation of the flow.

A venturi can then be used as a flow device for measuring the velocity of the wet gas. The venturi consists of a convergent section 10 into a narrow passage 11 in a pipe 1. By measuring the upstream pressure 7 and the pressure in the narrow passage 8 by means of a pressure transmitter 6, the flow rate of the fluid(s) can be determined. The preferred flow direction is shown with an arrow 9.

The water fraction and density of the wet gas can be determined by combining the measurement from a gamma detector 16, which measures the gamma photons emitted by a gamma source 15, with electrical radio frequency measurements performed with the antennas 14. The antennas 14 are in effect coaxial conductors which are inserted into the pipe. The method for obtaining the water fraction and density using the apparatus shown in FIG. 2 is known to the skilled person and is also described in WO 2007/129897.

The electrical measurement performed using the antennas 14 can then be used to obtain a measurement of the statistical variation of the flow. An electrical measurement which is directly scaled towards the diameter of the pipe is preferred since the droplet diameter is also related to the pipe diameter. Electrical parameters such as the waveguide cut-off frequency of a pipe, the phase or frequency characteristic of a wave which is reflected from a diameter change in the pipe (such as the divergent section of the venturi 12) or the measured phase coefficient or attenuation coefficient of a propagating electromagnetic wave within the pipe are well suited electrical parameters or the resonance frequency of a resonating cavity or structure within the pipe. In fact, any loss or phase measurements of a propagating electromagnetic wave within the pipe or the measured loss or phase from a reflected wave from the medium in the pipe can be used. The wavelength of the measurement signal should preferable be small such that the signal is able to detect small variations caused by small liquid droplets. Most devices based on measurement of cut-off frequency, frequency of a resonant cavity in the pipe and reflection characteristics or the phase or attenuation coefficient of a propagating electromagnetic wave uses signals with small wavelengths. A typical frequency range is 100-5000 MHz depending on the pipe diameter, however larger and smaller frequencies may also be used. Examples for how most of these electrical parameters can be obtained using the apparatus shown in FIG. 2 is further described in WO 2007/129897 and WO 2005/057142, hereby incorporated by reference. The resonance frequency of a resonant cavity within the pipe can also be used as the electrical signal. Example of a device suitable for this purpose can be found in WO 03/034051. This device can also be used to measure the water fraction of the wet gas. Capacitance and inductance sensors are also widely used to measure the permittivity and water fraction of multi phase fluids. Electrical signals obtained from capacitance and inductance sensors may also be used; however, these devices are less suited due to the low frequency and hence large wave length of the electrical signals and hence less suited to capture the small variations required for accurate liquid measurements of a wet gas.

When the water fraction and statistical variation of the electrical measurement have been derived, the liquid fraction of the wet gas can be calculated in an iterative manner using the empirical derived relationship shown in FIG. 3.

The x-axis 17 of FIG. 3 is the statistical standard variation of a measured reflection or wave guide cut-off frequency in the pipe multiplied with a scaling factor which is a function of the water content in the liquid. The y-axis 18 of FIG. 3 is the liquid fraction (water+condensate) as a percentage of the total volume of the pipe.

This curve has been derived based on empirical measurements with gas, condensate and water at Statoil's test facility at Kårstø at an operating pressure of 120 barg and is valid for a droplet/gas mixture. The curve can also be modified for applications where some of the liquid is contained as a film along the wall in combination with liquid droplets by using a correction factor. The correction factor can be derived based on empirical measurements.

The procedure for determining the composition of the wet gas then becomes

1) Perform electrical measurement such as the phase coefficient or attenuation coefficient of a traveling electromagnetic wave, pipe cut-off frequency, reflection frequency or resonance frequency. Examples for how some of these features can be obtained are described in WO 2007/129897 and WO 2005/057142.

2) Measure the density of the wet gas using a gamma ray based densitometer (15, 16) as described in WO 2007/129897 and WO 2005/057142.
3) Calculate the water fraction of the wet gas (e.g. multiphase mixture). Examples for how this can be performed can be found in WO 2007/129897 or WO 2005/057142. The density of oil, gas and water in addition to the permittivity (dielectric constant) and mass attenuation of these fluids are assumed to be known in advance. WO 2007/129897 provides further information how these parameters can be obtained.
4) Calculate the water liquid ratio (water liquid ratio WLR=percentage of water in the liquid fraction) based on the measured water fraction from step 3 and a first estimate of the liquid fraction. The calculated liquid fraction from step 3 may be used as a first estimate or the result from the previous calculation of the liquid fraction.
5) Calculate a statistical parameter of the electrical measurement performed in step 1 such as the standard deviation of the past 10-100 measurements. Fewer or more measurements may also be used; however, too few measurements may increase the measurement uncertainty and too many measurements may cause undesired dynamical behavior such as slow response to rapid changes in the liquid content.
6) Calculate the experimental derived WLR dependent correction factor and multiply it with the statistical parameter from step 5 to obtain the x-value 17 for the curve 20 in FIG. 3.
7) Use the curve 20 to calculate the liquid fraction 18 of the wet gas.
8) Calculate an updated value for the WLR using the liquid fraction from step 7 and water fraction from step 3 and repeat step 6-8 until the calculated WLR have converged to a stable value.

When step 1-8 has been completed, the composition (i.e. percentage of oil, water and gas) of the wet gas has been determined. The dominating factor in obtaining the liquid fraction of the wet gas is the curve shown in FIG. 3. Since this curve is mainly dependent on the statistical variation of the electrical signal and the water fraction of the wet gas, and the water fraction measurement resulting from step 1-3 is little affected by errors in the gas density, the liquid fraction measurement (and GVF) becomes almost unaffected by significant errors in the gas density. Since the water fraction is obtained in an independent calculation without any use of the statistical parameter from step 5, the measurement algorithm of step 1-8 becomes robust avoiding uncontrolled escalation in the liquid fraction calculation or multiple solutions for the calculation since both an increase in the liquid content and increase in the water fraction, through the WLR dependent correction factor, provide an increase in the x-value 17 of FIG. 3. However, since the water fraction is calculated in step 1-3 prior to the calculation loop using the curve 20 of FIG. 3, the water fraction is fixed and only the liquid fraction is changed during the iteration loop in step 6-8.

FIG. 4 shows a test of the method described above performed at the wetgas test facility at South West Research Center in Texas at a pressure of 120 barg. The x-axis shows a time period of 3000 seconds and the y-axis 21 shows the GVF (gas fraction). The thick line 23 is the reference gas fraction and the thin line 24 is the measured gas fraction according to the invention.

When the fraction of oil (condensate), water and gas and the density of oil, water and gas are known, the velocity of the multiphase fluid can be derived based using a flow device 2.

The flow device may either be a device based on measurement of pressure drop 6 such as a venturi or by using cross correlation techniques as described in WO 2007/129897 and WO 2005/057142. Other flow devices 2 based on measurement of differential pressure such as a V-cone or orifice plate and Dall Tubes may also be used. These are well known measurement principles and further information of how to use these devices can be found in *Handbook of MultiPhase Metering* issued by Norwegian Society for Oil and Gas Measurement.

When the velocity of the liquid and gas components of the wet gas is know in addition to the cross sectional area of the pipe, the flow rate of the individual components of the wet gas (oil, water and gas) can easily be calculated.

The method described in step 1-8 is in effect a way of counting the droplets contained in the gas phase. By using the models for calculating the flow rate of a wet gas based on a venturi according to "*New correction method for wet gas flow metering based on two phase flow modeling: Validation on industrial Air/Oil/Water tests at low and high pressure*", by S. Geraldine et at the $2^{th}$ International North Sea Flow Measurement Workshop—2008 [1], the liquid droplet diameter droplet velocity, liquid film thickness and liquid film velocity can be derived in addition to the gas velocity. This information can be used to provide additional correction factors to the curve 20 in FIG. 3. The correction factors can be derived based on empirical derived correlations and implemented in the following way:

1) Perform electrical measurement such as the phase coefficient or attenuation coefficient of a traveling electromagnetic wave, pipe cut-off frequency or reflection frequency as described in WO 2007/129897 and WO 2000/057142.
2) Measure the density of the wet gas using a gamma ray based densitometer (15, 16) as described in WO 2007/129897 and WO 2005/057142.
3) Calculate the water fraction of the wet gas (e.g. multiphase mixture) as described in WO 2007/129897, NO 324812 or WO 2005/057142. The density of oil, gas and water in addition to the permittivity (dielectric constant) and mass attenuation of these fluids are assumed to be known in advance. WO 2007/129897 provides further information how these parameters can be obtained.
4) Calculate the water liquid ratio (water liquid ratio WLR=percentage of water in the liquid fraction) based on the measured water fraction from step 3 and a first estimate of the liquid fraction. The calculated liquid fraction from step 3 may be used as a first estimate or the result from the previous calculation of the liquid fraction.
5) Calculate a statistical parameter of the electrical measurement performed in step 1 such as the standard deviation of the past 10-100 measurements. Fewer or more measurements may also be used, however too few measurements may increase the measurement uncertainty and too many measurements may cause undesired dynamical behavior such as slow response to rapid changes in the liquid content.
6) Calculate the experimental derived WLR dependent correction factor, droplet diameter correction factor and film fraction correction factor and multiply them with the statistical parameter from step 5 to obtain the x-value 17 for the curve 20 in FIG. 3
7) Use the curve 20 to calculate the liquid fraction 18 of the wet gas 8) Calculate an updated value for the WLR using the liquid fraction from step 7 and water fraction from step 3 and repeat step 6-8 until the calculated WLR have converged to a stable value
9) Calculate the velocity of the liquid droplets, velocity of liquid film, liquid film, velocity of gas in addition to the film thickness and droplet diameter based on the measured fractions of step 8 and the measured delta pressure of the venturi 6 using the method and models described in [1]
10) Repeat step 6-9 until all the parameters calculated in step 9 have converged to a stable value.

In addition to the elements described above, the measurement apparatus also contains elements for performing electrical measurements and computer for performing the calculations; however, it is well known how to realize the required electronics and software to perform these measurements and calculations.

Transmission and reflection methods are well known method for material characterization as shown in FIGS. 5 and 6. Electromagnetic methods can be based on a radiating slot 23 through the wall as shown in FIG. 5 or by using an open ended coaxial conductor 24 as shown in FIG. 6. A pulse or continuous frequency is transmitted on the coaxial cable 24. Based on a measurement of the amplitude and phase variations reflected back on the coaxial conductor, the permittivity of the material within the pipe can be determined. The design and working principles of transmission and reflection sensors as shown in FIGS. 5 and 6 is further described in "*Microwave Electronics—measurement and material characterization*" by Chen et. al., Wiley (2004), and "*Permittivity Measurements of Thin Liquid Film Layers using open-ended Coaxial Probes*", Meas. Sci. Technol., 7 (1996), 1164-1173.

Two antennas as shown in FIG. 7 can also be used to perform the electromagnetic measurements. The antennas are coaxial conductors isolated by an insulating material from the pipe wall, and penetrating slightly into the pipe acting as a dipole antenna inside the pipe. The sending antenna 28 and receiving antenna 29 can also be made as a separate unit 27 which is assembled into the pipe or as to separate antennas. The antennas may also be located along the circumference of the pipe or axially alone the pipe or in a combination of any axial and radial location. This device can be used to measure loss, phase of an electromagnetic wave within the medium of the pipe.

A similar arrangement based on three antennas for performing electromagnetic measurements is shown in FIG. 8. The antennas are coaxial conductors isolated by an insulating material from the pipe wall and penetrating slightly into the pipe acting as a dipole antenna inside the pipe. The antennas may be made as one compact probe unit 35 as shown in FIG. 8 where the transmitting antenna 33 and the two receiving antennas 34, 32 are electrical insulated from the metal housing 35 by ceramic or glass. The device can be used to measure, phase and loss of an electromagnetic wave in the pipe which also can be further extended to measure the phase coefficient and loss coefficient of an electromagnetic wave traveling within the pipe. WO 2007/129897 provides further information for how this device can be used to obtain these parameters.

In the above description of the invention, absorption of gamma photons is used for determining the density of the wet gas. Other means of determining the density of the wet gas may also be used such as (but not limited to) a venturi in combination with cross correlation velocity measurement, combination of multiple mass flow devices with different flow characteristics vs. fluid density, or Equation of State models based on the hydrocarbon composition for the oil+gas fluid. A density measurement based on absorption of gamma photons, however, is the preferred method for determining the density of the wet gas.

The water fraction of the multiphase mixture may also be derived by using dual energy mass absorption measurements as described in U.S. Pat. No. 5,135,684 or capacitance/inductance measurement principle in combination with single energy mass absorption as described in NO 304,333, or capacitance/inductance measurement principle in combination with cross correlation and ventui as shown in WO00/45133. The water fraction measurement obtained above can then be combined with a statistical calculation of an electromagnetic measurement such as the phase coefficient or attenuation coefficient of a traveling electromagnetic wave, pipe cut-off frequency or reflection or measurement of loss or phase of a electromagnetic wave traveling within the pipe or reflected from the medium in the pipe to calculate the liquid fraction of the wet gas. The devices shown in FIGS. 5 and 6 or any combination of at least two antennas 14 as shown in FIG. 2 can be used in combination with any technique for measurement of the water fraction and density of a wet gas in order to obtain the desired electromagnetic measurement for determination of the liquid fraction and flow rates of the wet gas.

The invention claimed is:

1. A method for determining the flow rates of a fluid comprising a multi-component mixture of a gas and at least one liquid in a pipe, the method comprising the following steps:
    a. determining the permittivity of the multi-component mixture based on an electromagnetic measurement,
    b. determining the density of the multi-component mixture,
    c. obtaining the temperature and pressure,
    d. using a density and a permittivity of each component of the fluid mixture, and the result from the above steps a-c, the water fraction of the multi-component mixture is calculated,
    determining the liquid fraction and flow rates of the multi-component mixture by:
    e. calculating a statistical parameter related to the electromagnetic measurement,
    f. calculating the liquid fraction based on the statistical parameter from step e and the calculated water fraction from step d using an empirical derived curve,
    g. measuring the velocity of the multi-component mixture is based on measurement of pressure drop across a restriction in the pipe, and
    h. based on steps a-g, the flow rate of the individual components of the multi-component mixture is calculated.

2. A method according to claim 1, wherein the permittivity is determined based on measurement of a loss of an electromagnetic wave within the pipe.

3. A method according to claim 1, wherein the permittivity is determined based on measurement of a phase change of an electromagnetic wave within the pipe.

4. A method according to claim 1, wherein the permittivity is determined based on measurement of a phase or loss of a reflected electromagnetic wave within the pipe.

5. A method according to claim 1, wherein the permittivity is determined based on an electromagnetic measurement of a resonance frequency within the pipe.

6. A method according to claim 1, wherein the electromagnetic measurement for permittivity is based on measurement of energy loss and/or phase shift of an electromagnetic wave being reflected from the media within the pipe.

7. A method according to claim 1, wherein the statistical parameter is calculated from the electromagnetic measurement taken from the group consisting of: loss of an electromagnetic wave within the pipe; phase change of an electromagnetic wave within the pipe; phase or loss of a reflected electromagnetic wave within the pipe; resonance frequency within the pipe; energy loss and/or phase shift of an electromagnetic wave being reflected from the media within the pipe.

8. A method according to claim 1, wherein a standard deviation is used as the statistical parameter.

9. A method according to claim 1, wherein the density is determined based on a measurement of absorption of photons.

10. A method according to claim 1, wherein the empirical derived curve from the statistical parameter of step e is corrected for the droplet size of a liquid.

11. A method according to claim 1, wherein the empirical derived curve from the statistical parameter of step e is corrected for a presence of liquid film along the pipe wall.

12. A method according to claim 1, wherein a venturi is used to provide pressure drop.

13. A method according to claim 1, wherein a V-cone is used to provide pressure drop.

14. A method according to claim 1, wherein a Dall tube is used to provide pressure drop.

15. A method according to claim 1, wherein an orifice is used to provide pressure drop.

16. A method according to claim 1, wherein cross-correlation techniques are used in determining the velocity of the multi-component mixture.

17. An apparatus for determining the flow rates of a fluid comprising a multi-component mixture of a gas and at least one liquid in a pipe, the apparatus comprising a tubular section and the following elements:
   a. electromagnetic measurement means for determining a permittivity of the multi-component mixture,
   b. means for determining a density of the multi-component mixture,
   c. means for determining a temperature and pressure,
   d. means for calculating the water fraction of the multi-component mixture based on a density and a dielectric constant of each component of the fluid mixture,
   means for determining the liquid fraction and flow rates of the multi-component mixture having the following
   e. a first mathematical program for calculating a statistical parameter,
   f. an empirical derived curve and a second mathematical program for calculating a liquid fraction of the multi-component mixture based on said statistical parameter and said water fraction,
   g. means for measuring the velocity of the multi-component mixture based on measurement of pressure drop across a restriction in the pipe, and
   h. means for calculating the flow rate of the individual fractions of the multi-component mixture based on steps a-g.

18. An apparatus according to claim 17, comprising means for transmitting electromagnetic energy into the tubular section and recording received electromagnetic energy from the tubular section.

19. An apparatus according to claim 18, comprising means for providing electromagnetic resonances within the tubular section.

20. An apparatus according to claim 17, comprising means for providing electromagnetic resonances within the tubular section.

21. An apparatus according to claim 17, comprising means for transmitting electromagnetic energy into the tubular section and recording reflected electromagnetic energy from the tubular section.

22. An apparatus according to claim 17, comprising means for measuring said velocity in a narrow passage of the tubular section.

23. An apparatus according to claim 17, wherein a venturi is used to determine said velocity.

24. An apparatus according to claim 17, wherein a V-cone is used to determine said velocity.

25. An apparatus according to claim 17, wherein the means for measuring said velocity is performed in two cross-sections of the tubular section by cross-correlating measurements.

26. An apparatus according to claim 17, comprising a radioactive source and photon detector for determining said density of multi-component mixture.

27. An apparatus according to claim 17, comprising multiple pressure drop measurement determining said density of multi-component mixture.

28. An apparatus according to claim 17, comprising a combination of a pressure drop device and cross correlation velocity device to determine said density of multi-component mixture.

* * * * *